United States Patent [19]
Iida

[11] Patent Number: 5,331,335
[45] Date of Patent: Jul. 19, 1994

[54] PANNING CONTROL DEVICE FOR CONTROLLING AREA OF DISPLAY IMAGE IN COMPUTER AIDED DESIGN SYSTEM

[75] Inventor: Masahiro Iida, Hachioji, Japan

[73] Assignee: Fujitsu Limited, Kawasaki, Japan

[21] Appl. No.: 744,119

[22] Filed: Aug. 9, 1991

[30] Foreign Application Priority Data

Aug. 10, 1990 [JP] Japan .................. 2-212423

[51] Int. Cl.⁵ .............................. G09G 1/06
[52] U.S. Cl. ..................... 345/121; 345/133
[58] Field of Search ............ 340/724, 726, 723, 747, 340/731, 710, 707; 178/18, 19; 345/121, 123, 133, 127, 156, 163, 112

[56] References Cited

U.S. PATENT DOCUMENTS

| | | | |
|---|---|---|---|
| 4,532,605 | 7/1985 | Waller | 340/731 |
| 4,602,251 | 7/1986 | Sawada et al. | 340/724 |
| 4,794,634 | 12/1988 | Torihata et al. | 178/18 |
| 4,880,968 | 11/1989 | Kwang-Chien | 340/710 |
| 4,961,072 | 10/1990 | Sekikawa | 340/731 |
| 5,075,673 | 12/1991 | Yanker | 340/724 |
| 5,119,081 | 6/1992 | Ikehira | 340/723 |

FOREIGN PATENT DOCUMENTS

| | | |
|---|---|---|
| 61-42686 | 3/1986 | Japan . |
| 62-202266 | 9/1987 | Japan . |
| 1-124065 | 5/1989 | Japan . |
| 1-265363 | 10/1989 | Japan . |
| 1-306894 | 12/1989 | Japan . |
| 2-45878 | 2/1990 | Japan . |
| 2183293 | 7/1990 | Japan ....................... 340/724 |

OTHER PUBLICATIONS

"IMS G300 Colour Video Controller", inmos, preliminary data Nov. 1988, pp. 73-75, 85, 93-95.

Primary Examiner—Ulysses Weldon
Assistant Examiner—Doon Chow
Attorney, Agent, or Firm—Armstrong, Westerman, Hattori, McLeland & Naughton

[57] ABSTRACT

A panning control device includes a memory for storing image data, a display for displaying a part of the image data stored in the memory as a display image, and a pointing arrangement for pointing out a specific position of the display image displayed at the display. A panning control arrangement is also provided which is connected to the pointing arrangement, for calculating and outputting guide information concerning a display image to be displayed when the specific position pointed out by the pointing arrangement is placed at a center of the image displayed at the display. A display control arrangement is provided which is connected to the memory, the display, the pointing arrangement, and the panning control arrangement for controlling the display image at the display to conform to the guide information output from the panning control arrangement such that the guide information includes frame lines of the display image to be displayed and a travel indication line having one end at the specific position pointed out by the pointing arrangement and having its other end at another location on the display.

13 Claims, 8 Drawing Sheets

PANNING CONTROL DEVICE FOR CONTROLLING AREA OF DISPLAY IMAGE IN COMPUTER AIDED DESIGN SYSTEM

BACKGROUND OF THE INVENTION

1. Field of the Invention

The present invention relates to a panning control device, more particularly, to a panning control device for controlling an area of a display image on a display unit in a computer aided design system.

2. Description of the Related Art

Recently, a computer aided design (CAD) system using an engineering work station (EWS) has been developed and provided for various design work. Note, the CAD system is used in various fields, for example, the circuit design field, architectural design field, plant design field and the like, and in such a CAD system, a man-machine interface, by which a human operator communicates with the CAD system, is important, and thus a more advanced man-machine interface enabling an easy operation and a high speed operation is required.

Currently, a pointing device (for example, a mouse) is used as a man-machine interface in the CAD system, instead of a conventional keyboard, and graphic forms or drawings are easily described or edited by using the pointing device.

Note, in such a CAD system, when displaying a larger size graphic form than an image size of a display unit, or when displaying a whole shape of the graphic form on the display unit of the CAD system having a smaller image size of the display unit than the whole shape of the graphic form, the whole shape of the graphic form is reduced and displayed at the display unit of the CAD system. Nevertheless, it is difficult for an operator (or designer) to carry out a design process by using the reduced graphic form (or whole shape of the graphic form), and thus preferably a part of the graphic form having a larger scale is displayed at the display unit of the CAD system. Further, the CAD system should be able to freely change a display image on the display unit in accordance with the operator's requirements.

In a CAD system according to the prior art, to display a required part of a display image (or graphic form), first the operator points (pan-hits) at a specific position on a display image, and that image is then displayed at an image area of a display unit, by using a pointing device, and the display image is then changed so that the specific position (pan-hit position) pointed out by the pointing device is placed at the center of the image area of the display unit.

In the above prior art CAD system, however, only the display image displayed at the display unit (image area) is changed, and thereafter, the pan-hit position is placed at the center of the image area, and thus the operator cannot recognize the area of the following display image which has been changed after a panning operation (pan-hit operation) is completed. Accordingly, the pan-hit operation must be repeatedly carried out to obtain a display of a required area of the graphic form. Furthermore, when the pan-hit operation is carried out many times, a part of the graphic form currently displayed at the image area of the display unit cannot be immediately recognized by the operator, and in such a case, after displaying a whole shape of the graphic form by a reduction operation, an enlarging operation and then a pan-hit operation must be carried out.

As described above, in the prior art CAD system, a problem arises in that the labour effectivity thereof cannot be increased because a required part of the display image cannot be easily displayed at the image area of the display unit.

SUMMARY OF THE INVENTION

Therefore, an object of the present invention is to provide a panning control device by which a display of a required display image at a display unit can be easily obtained and thus the labour effectivity thereof is increased.

According to the present invention, there is provided a panning control device comprising: a memory unit for storing image data; a display unit for displaying a part of the image data stored in the memory unit, as a display image; a pointing unit for pointing out a specific position of the display image displayed at the display unit; a panning control unit, connected to the pointing unit, for calculating and outputting guide information concerning a display image to be displayed at the display unit, when the specific position pointed out by the pointing unit is placed at a center of the image displayed at the display unit; and a display control unit, connected to the memory unit, the display unit, the pointing unit, and the panning control unit, for controlling the display image at the display unit to conform to the guide information output from the panning control unit.

The guide information displayed at the display unit may include a travel indication line defined from the specific position pointed out by the pointing unit to the center of the image displayed at the display unit. The travel indication line may be formed by an arrow led from the specific position to the center of the image. The guide information displayed at the display unit may include frame lines of the display image to be displayed at the display unit, when the specific position pointed out by the pointing unit is placed at the center of the image displayed at the display unit.

A scope of the display unit may include an image area for displaying the display image, and further, may include a message area for displaying messages, and a menu area for displaying processes and graphic elements. Furthermore, the scope of the display unit may also include a data area for displaying image data of the display image currently displayed at the image area.

The pointing unit may comprises a mouse, which may be an optical mouse including a mouse body and a reflection board. The mouse body also may include a button for controlling a panning operation by a depression or release of the button.

The pointing unit may comprise a tablet including a stylus pen and a tablet table, and the stylus pen may include a button for controlling a panning operation by a depression or release of the button. The panning control unit and the display control unit may be constituted by a one chip microprocessor unit.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments, the problems of the prior art will be first explained with reference to FIGS. 1A and 1B.

Figure 1A:
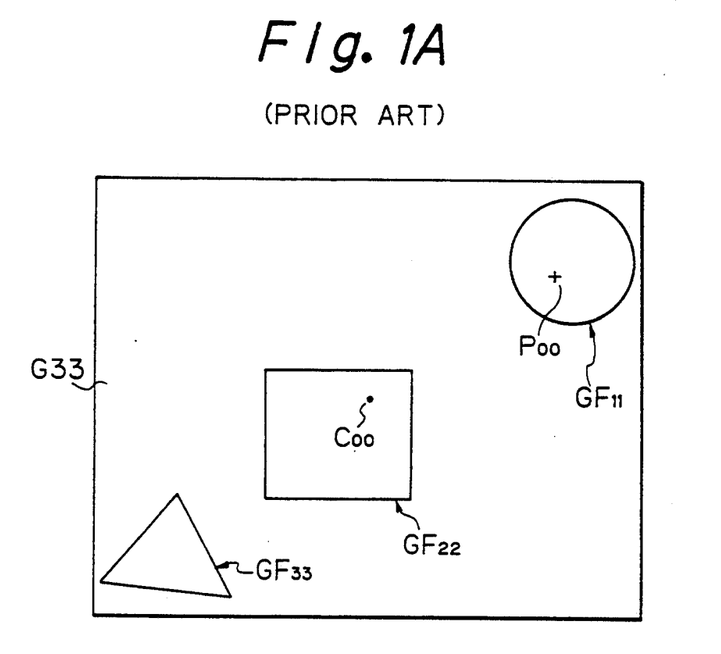
FIGS. 1A and 1B are diagrams for explaining a panning process of an example of a panning control device according to the prior art.
Figure 1B:
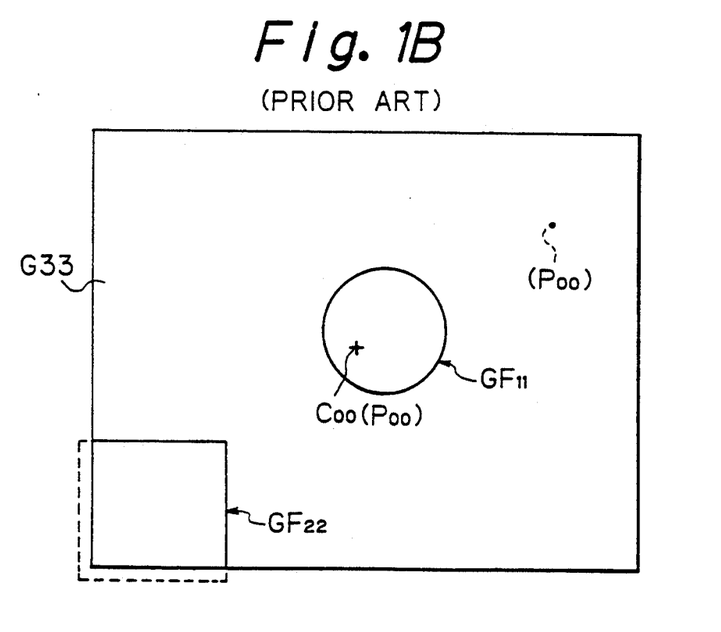

FIGS. 1A and 1B are diagrams for explaining a panning process of an example of a panning control device according to the prior art. In FIGS. 1A and 1B, references $GF_{11}$ denotes a graphic in the form of a circle, $GF_{22}$ denotes a graphic in the form of a square, $GF_{33}$ denotes a graphic in the form of a triangle, G33 denotes an image area of a display unit, $C_{00}$ denotes a center of the image area G33, and $P_{00}$ denotes a specific position pointed out by a pointing device. Note, in FIGS. 1A and 1B, a mark "+" denotes a position of a cursor, and the cursor position "+" shown in FIG. 1A corresponds to the specific position $P_{00}$ and the cursor position "+" shown in FIG. 1B corresponds to the center $C_{00}$ of the image area G33.

In the prior art panning control device, when an operator (designer) requires a display of the graphic forms $GF_{11}$ and $GF_{22}$ at the image area G33 of the display unit, such that the graphic form $GF_{11}$ (circle shape) is located at about the center $C_{00}$, the operator moves the position "+" of the cursor at the specific position $P_{00}$. Note, the specific position $P_{00}$ is a position at which the operator considers a required center satisfies the conditions of the graphic forms (or display image), but the operator cannot confirm which area will be displayed at the image area G33, or cannot confirm that which of the following display images will have a center as specified at the specific position $P_{00}$, and therefore, the required display image may not be displayed at the image area G33.

Concretely, as shown in FIG. 1B, when determining the specific position $P_{00}$ as the center $C_{00}$, all of the graphic form $GF_{22}$ (square shape) may not be shown in the image area G33 of the display unit, i.e., the graphic form $GF_{22}$ may not be completely displayed at the image area G33. Note, the following display image, which corresponds to the image shown in FIG. 1B, cannot be confirmed until after a panning process is completed and the following display image is actually displayed at the image area G33 of the display unit.

Consequently, the pan-hit operation (panning operation) must be carried out repeatedly to obtain a display of a required area of the display image at the image area G33 of the display unit. Furthermore, as described above, when the pan-hit operation is carried out many times, a part of the graphic form (image data) currently displayed at the image area of the display unit cannot be correctly recognized by the operator, and in such a case, first a whole shape of the graphic form must be displayed by a reduction operation, and then the image must be enlarged and a pan-hit operation must be carried out.

As described above, in the prior art CAD system, a problem arises in that labour effectivity cannot be increased because a display of a required part of the display image cannot be easily obtained at the image area of the display unit.

Next, the preferred embodiments of a panning control device according to the present invention will be explained.

Figure 2:
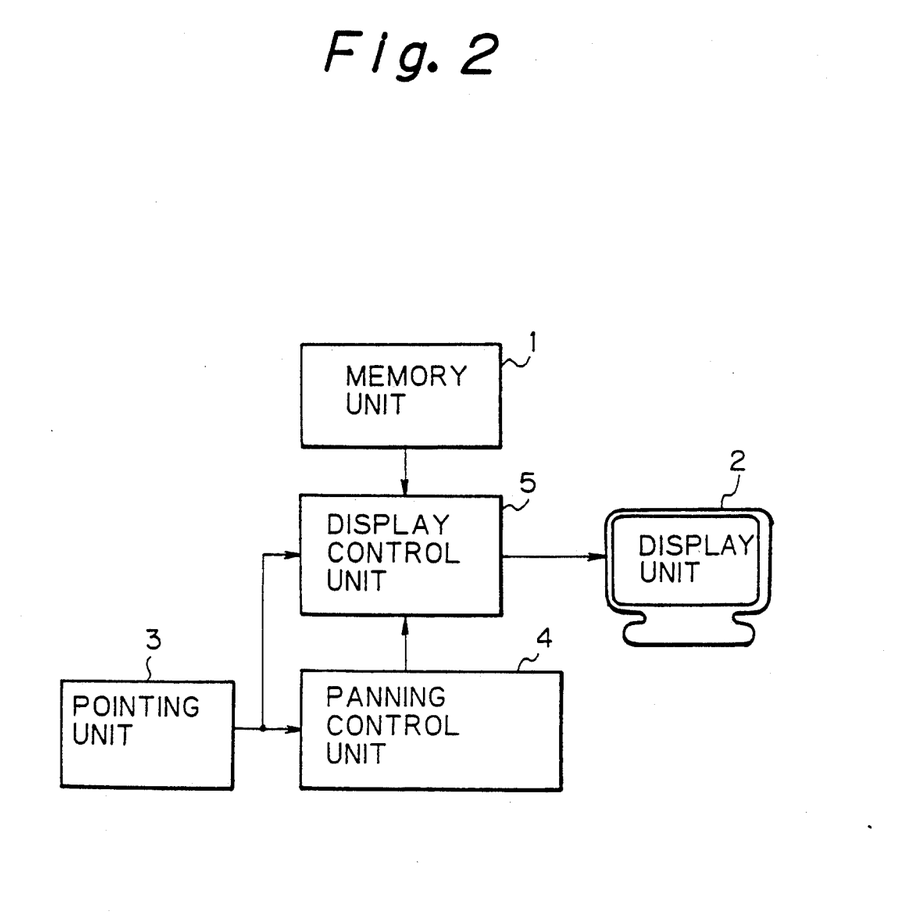
FIG. 2 is a diagram showing a principle of the configuration of a panning control device according to the present invention.

FIG. 2 is a diagram showing a principle of the configuration of a panning control device according to the present invention.

As shown in FIG. 2, the panning control device comprises a memory unit 1, a display unit 2, a pointing unit 3, a panning control unit 4, and a display control unit 5. The memory unit 1 is used to store image data, the display unit 2 is used to display a part of the image data stored in the memory unit 1, as a display image, and the pointing unit 3 is used to point out a specific position of the display image displayed at the display unit 2. The panning control unit 4 is used to calculate and output guide information concerning a display image to be displayed at the display unit 2, to the display control unit 5, when the specific position pointed out by the pointing unit 3 is placed at the center of the display image (or an image area) at the display unit 2, and the display control unit 5 is used to control or arrange the display image at the display unit 2 so that it conforms to the guide information output from the panning control unit 4.

In the above panning control device, when displaying a part of the image data stored in the memory unit 1, first a specific position to be displayed at the center of the display image displayed at the display unit 2 is pointed out by the pointing unit 3. Note, in this case, guide information concerning the display image (following display image) to be displayed at the display unit 2 is displayed at the display unit 2 by the panning control unit 4 through the display control unit 5. Further, the display image (previous display image) at the display unit 2 is changed to conform to guide information output from the panning control unit 4, i.e., the previous display image is changed to the following display image in which the specific position pointed out by the pointing unit 3 on the previous display image is placed at the center of the following display image (image area).

Figure 3:
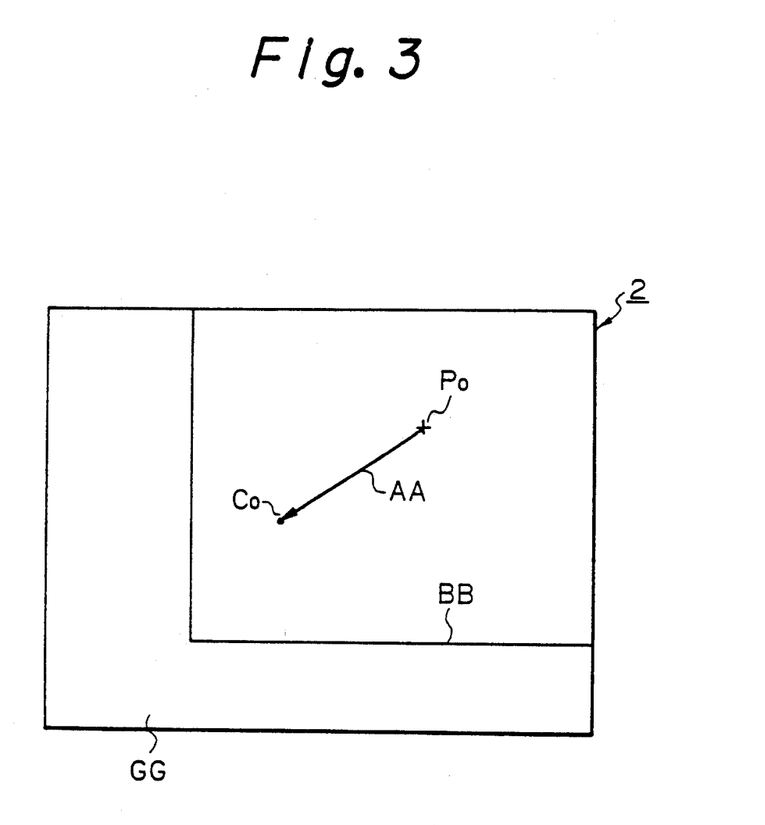
FIG. 3 is a diagram for explaining an operation of the panning control device according to the present invention.

FIG. 3 is a diagram for explaining an operation of the principle of the panning control device according to the present invention.

As shown in FIG. 3, the guide information displayed at the display unit 2 is, for example, a travel indication line (line segment) AA defined from the specific position $P_0$ pointed out by the pointing unit 3 to the center $C_0$ of the display image at the display unit 2. Note, the travel indication line AA is formed by an arrow led from the specific position $P_0$ to the center $C_0$, and a traveling direction and a traveling distance are displayed by the arrow (AA). Further, the guide information displayed at the display unit 2 includes, for example, frame lines of the display image to be displayed at the display unit 2, when the specific position pointed out by the pointing unit 3 is placed at the center of the display image at the display unit 2. Namely, the frame lines can indicate frames of the following display image at the previous display image (which is currently displayed at the display unit 2), and thus the operator can recognize the area of the following display image by looking at the previous (or current) display image.

Accordingly, the operator can recognize or confirm an area of the display image to be displayed at the display unit 2 before it is displayed, by using the guide information displayed at the display unit 2. Namely, it is not necessary to carry out a pan-hit operation many times to display a required area of the display image, and thus the pan-hit operations needed to obtain a display of a required display image at the display unit 2 can be greatly reduced. Namely, a required display image can be easily obtained at a display unit 2, and thus the labour effectivity can be increased.

Figure 4:
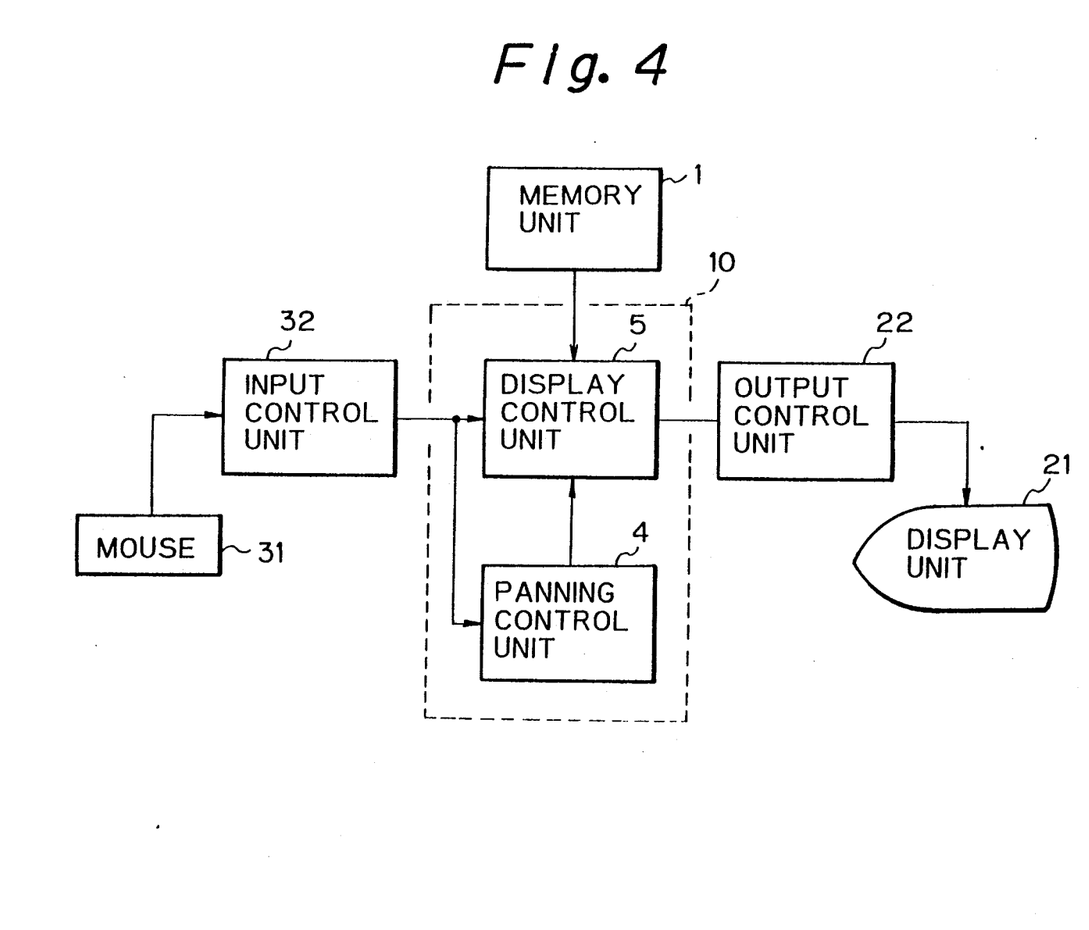
FIG. 4 is a diagram showing an embodiment of a panning control device according to the present invention.

FIG. 4 is a diagram showing an embodiment of a panning control device according to the present invention. In FIG. 4, reference numeral 1 denotes a memory unit, 21 denotes a display unit, 22 denotes an output control unit, 31 denotes a mouse, 32 denotes an input control unit, and 10 denotes a central processing unit (CPU). Note, the CPU 10 includes a panning control unit 4 and a display control unit 5.

The memory unit 1 is used to store image data for a graphic form, and a display image (for example, a whole of the graphic form or a part of the graphic form) is displayed at the display unit 21 through the CPU 10 and the output control unit 22, by reading out the image data stored in the memory unit 1.

Figure 7A:
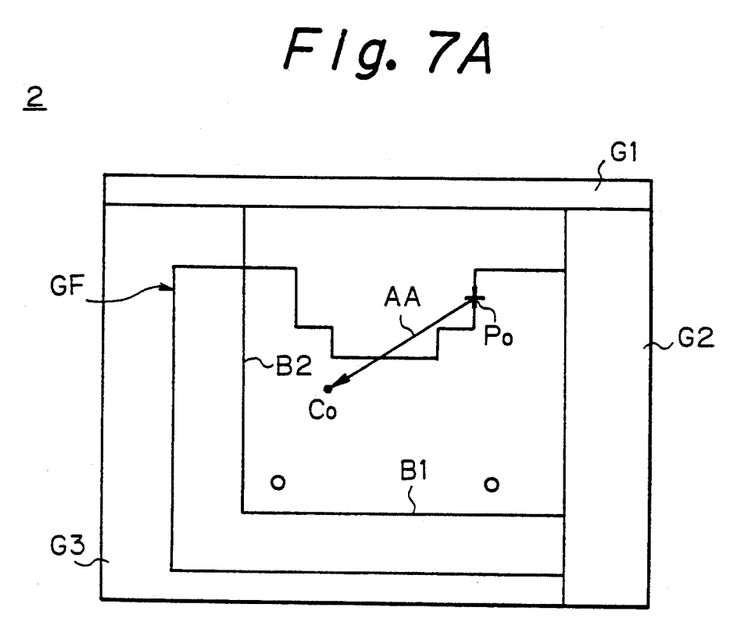
FIGS. 7A and 7B are diagrams for explaining a panning process of the embodiment of the panning control device according to the present invention.
Figure 7B:
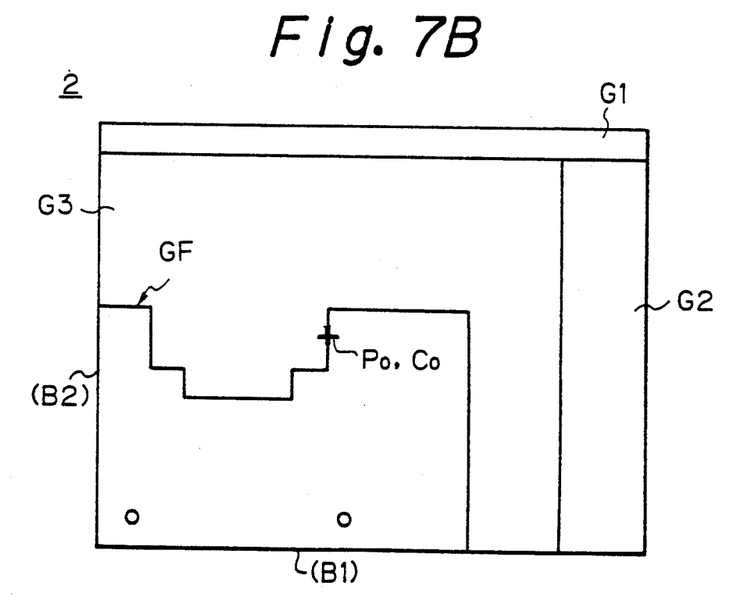
Figure 8A:
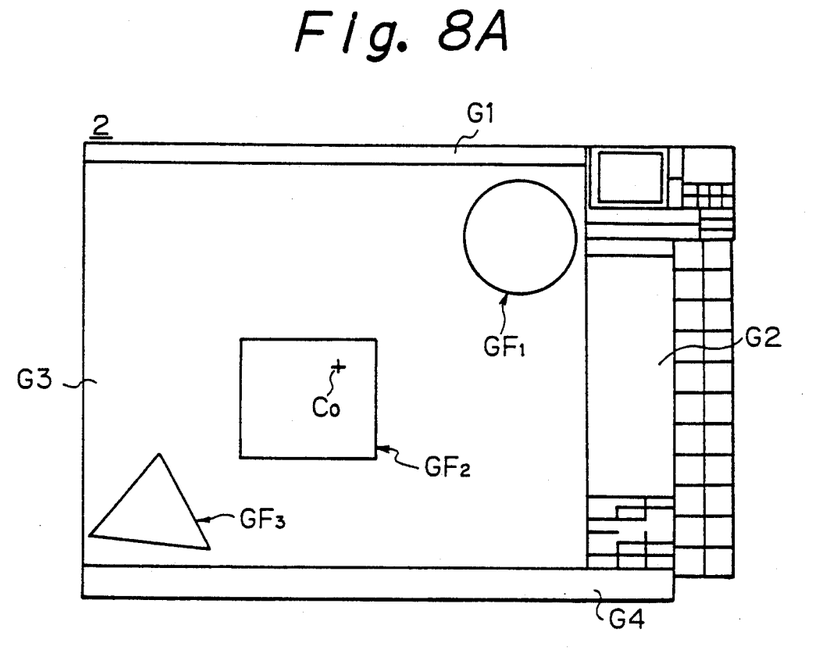
FIGS. 8A and 8B are diagrams for explaining a panning process of the embodiment of the panning control device according to the present invention.
Figure 8B:
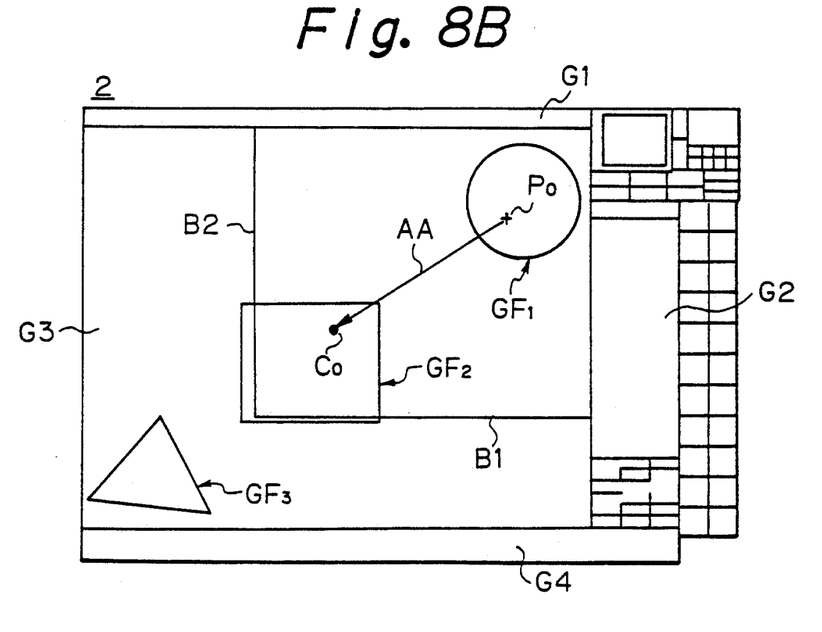

The CPU 10 is, for example, formed by a one chip microprocessor unit, and various image processes are carried out by the CPU 10. The display unit 21 is, for example, formed by a high definition type display or a graphic display. A scope of the display unit 21 is, for example, constituted as shown in FIGS. 7A, 7B, or 8A. 8B. In FIGS. 7A, 7B, 8A, and 8B, reference G1 denotes a message area, G2 denotes a menu area, G3 denotes an image area, and G4 denotes a data area. The message area G1 is used for displaying messages from the CAD system (or the CPU 10), and the operator carries out processes with reference to the displayed messages. The menu area G2 is used for displaying processes or graphic elements,. and the operator selects a required process or graphic elements by using the mouse 31. The image area G3 is used for displaying a display image, and the results of an addition process, a deletion process, a modification process, and the like are displayed at the image area G3. Note, guide information of the present embodiment is also displayed at the image area G3. The data area G4, which is provided only in the embodiment shown in FIGS. 8A and 8B, is used for displaying image data of the display image currently displayed at the image area G3.

The output control unit 22 is used to control the display unit 21 in accordance with control signals output from the CPU 10. The mouse 31, which is a known pointing device, is used to point out a specific position $P_0$ of the display image displayed at the image area G3 of the display unit 21. Note, the specific position $P_0$ pointed out by the mouse 31 is determined by a cursor displayed at the display unit 21, and the position of the cursor is moved in accordance with the movement of the mouse 31. Further, the specific position $P_0$ at the current display image (previous display image) is moved to the center $C_0$ of the following display image to be displayed at the display unit 21.

The input control unit 32 is used to output signals denoting a travel speed and a travel distance, in accordance with the movements of the mouse 31, to the CPU 10, and the CPU 10 moves the cursor at the display image of the display unit 21 in response to the signals output from the input control unit 32.

The display control unit 5 is used to convert the image data read out from the memory unit 1 into specific signal forms, and the signals converted by the display control unit 5 are transferred to the display unit 21 through the output control unit 22, whereby a graphic image (display image) is displayed at the display unit 21. Note, the display control unit 5 is realized by a function of the CPU 10.

The panning control unit 4 is used to generate a travel indication line AA and frame lines BB (B1, B2) by using the signals output from the CPU 10 through the input control unit 32. Note, the travel indication line AA and the frame lines BB (B1, B2) are supplied from the panning control unit 4 to the display control unit 5, and are converted by the input control unit 32 and supplied to the display unit 21, so that the travel indication line AA and the frame lines BB (B1, B2) are displayed at the image area G3 of the display unit 21.

Figure 5A:
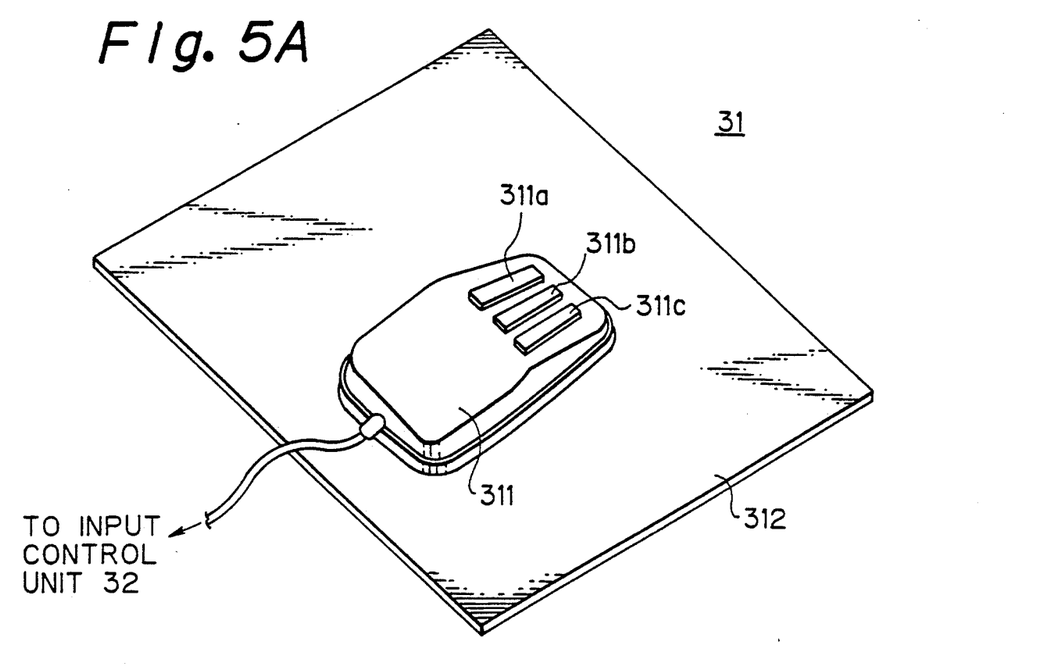
FIGS. 5A and 5B are diagrams showing examples of a pointing device applied to the panning control device according to the present invention.
Figure 5B:
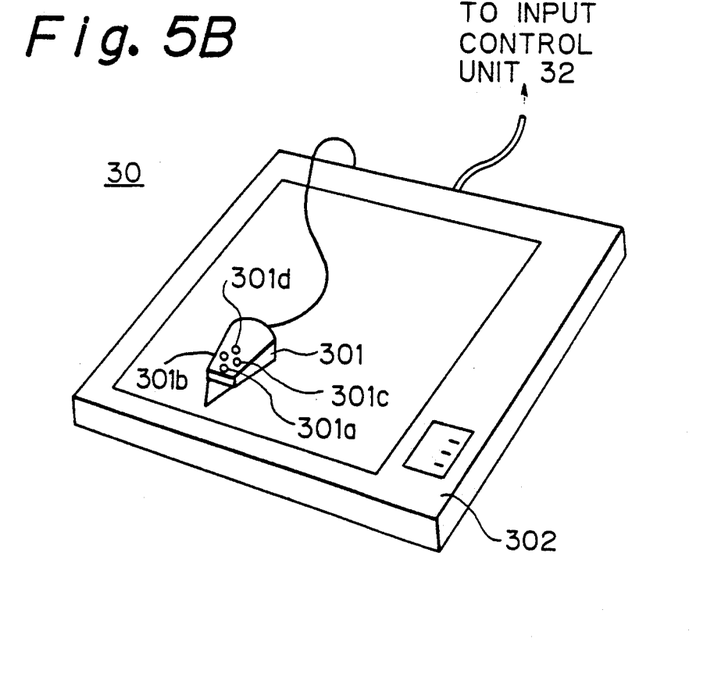

FIGS. 5A and 5B are diagrams showing examples of a pointing device applied to the panning control device according to the present invention, wherein FIG. 5A indicates a mouse and FIG. 5B indicates a tablet having a stylus pen. Namely, the pointing device applied to the panning control device is, for example, a mouse or a tablet, or the like.

First, as shown in FIG. 5A, the mouse 31, which is a known optical type mouse, is constituted by a mouse body 311 and a reflection board 312, and the mouse body 311 includes three buttons 311a, 311b, and 311c. The reflection board 312 is used to reflect and return light output from the mouse body 311, to the mouse body 311, so that signals indicating a travel speed and a travel distance of a cursor in accordance with the movement of the mouse 31 are output from the mouse body 311. Note, as described above, this mouse 31 is used to point out a specific position of the current (or previous) display image displayed at the display unit, and then the specific position is displayed at the center of the following display image. Note, the mouse 31 is not limited to only an optical type mouse, and a mechanical mouse also can be used for the pointing device. Also, the mouse 31 is used, for example, to input various points into the CAD system, to select a required instruction, and to carry out a panning operation (which will be described in detail), and the like, by moving the mouse body 311 on the reflection board 312 and depressing or releasing the buttons 311a to 311c provided on the mouse body 311.

Next, as shown in FIG. 5B, the tablet 32 comprises a stylus pen 301 and a tablet board 302, and the stylus pen 301 includes four buttons 301a, 301b, 301c, and 301d. In the CAD system, this tablet 32 may be provided as a optional device (pointing device), and the tablet 32 is used, for example, to input various points to the CAD system, to select a required instruction, or to carry out a panning operation and the like, by touching a head point of the stylus pen 301 to the tablet board 302 and depressing or releasing the buttons 301a to 301d provided on the stylus pen 301. Note, other pointing devices, e.g., a tablet cursor device and the like, also can be used as a pointing device in the panning control device.

Figure 6:
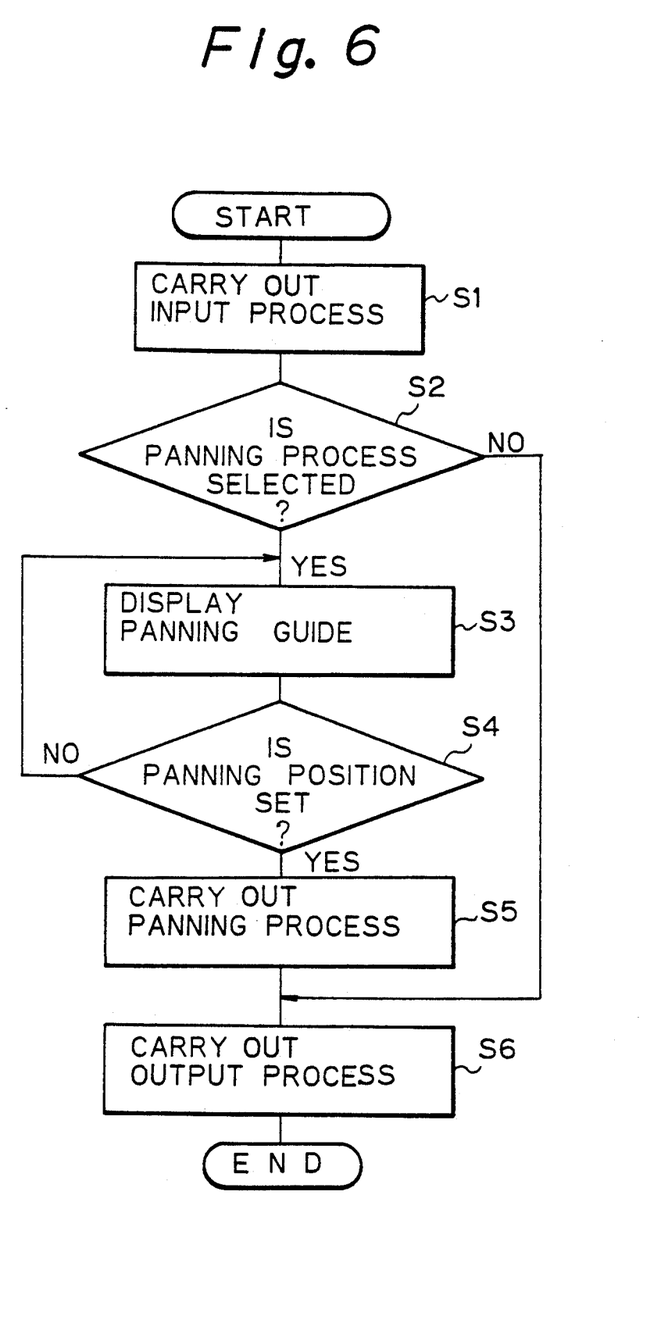
FIG. 6 is a flowchart of processes carried out in the embodiment of the panning control device according to the present invention.

Next, processes carried out in the embodiment of the panning control device according to the present invention will be explained. FIG. 6 is a flowchart of processes of the embodiment of the panning control device according to the present invention.

As shown in FIG. 6, an input process is carried out in step S1, and the flow proceeds to step S2. Note, as described above, this input process is carried out by using the mouse 31, and signals indicating a travel speed and a travel distance of the mouse 31 are supplied to the CPU 10 through the input control unit 32. Further, in this input process, the states of switching buttons provided on the mouse 31 are also supplied to the CPU 10 through the input control unit 32.

Next, in step S2, it is determined whether or not a panning process has been selected. Note, this panning process is selected, for example, by depressing a center button 311b of the mouse body 311 shown in FIG. 5A, or a button 301a of the stylus pen 301 shown in FIG. 5B.

In step S2, when it is determined that the panning process has not been selected, the flow proceeds to step S6, and an output process is carried out. Note, this output process is a normal process used for displaying various information at the display unit 21 in accordance with the signals output from the mouse 31, through the display control unit 5.

Then, in step S2, when it is determined that the panning process has been selected, the flow proceeds to step S3 and panning guide information is displayed at the display unit 21. Note, an example of the panning guide information is shown in FIG. 7A. In FIG. 7A, a travel indication line AA and frame lines B1, B2 are calculated by the panning control unit 4, and the calculated data for the travel indication line AA and the frame lines B1, B2 are transfered to the display unit 21.

Namely, in the panning control unit 4, the travel indication line AA is calculated as a line segment defined from a specific position $P_0$ at which a cursor is currently located at a displayed image (image area G3) to the center $C_0$ of the image area G3 of the display unit 21, and the calculated data for the travel indication line AA is supplied to the display unit 21 through the display control unit 5 and the output control unit 22. Further, in the panning control unit 4, the frame lines B1 and B2 are calculated as lines indicating a lower side frame and a left side frame when the specific position $P_0$ is at the center $C_0$ of the image area G3, and the calculated data for the frame lines B1 and B2 is supplied to the display unit through the display control unit 5 and the output control unit 22.

The flow then proceeds to step S4 and it is determined whether or not a panning position has been set. Note, this panning position is, for example, determined by releasing the center button 311b of the mouse body 311, or the button 301a of the stylus pen 301.

In step S4, when it is determined that the panning position is not set, the flow returns to step S3 and the panning guide information is continuously displayed at the display unit 21. Note, the travel indication line AA and the frame lines B1, B2 are changed in accordance with the cursor position (specific position $P_0$) controlled by the mouse 31, and when a required travel indication line AA and the frame lines B1, B2 are displayed at the display unit 21, the operator releases the center button 311b of the mouse body 311, or the button 301a of the stylus pen 301.

Then, in step S4, when it is determined that the panning position has been set, the flow proceeds to step S5, and a panning process (panning operation or pan-hit operation) is carried out. Namely, a part of the image data corresponding to a display image when the determined specific position $P_0$ is placed at the center $C_0$ of the image area G3 at the display unit 21 is read out from the memory unit 1 to the display control unit 5, and that part of the image data is arranged and output to the display unit 21 through the output control unit 22.

Further, the flow proceeds to step S6 and an output process, which is a normal process for displaying various information at the display unit 21, is carried out. Namely, area data of the display of the display image is displayed at the display unit 21 in accordance with the signals output from the display control unit 5 through the output control unit 22. Note, in step S6, the travel indication line AA and the frame lines B1, B2 are not displayed st the display unit 21.

As described above, a panning operation (or a pan-hit operation) is completed, and a new display image as shown in FIG. 7B is displayed at the image area G3 of the display unit 21. Namely, the display image (previous or current display image) shown in FIG. 7A is changed to the new display image (following display image) shown in FIG. 7B.

Note, in the above described embodiment, the specific position $P_0$ pointed out by the mouse 31 is located at a right upper area, and thus the travel indication line AA is directed from the right upper portion to the center $C_0$ of the image area G3, and the frame lines B1, B2 are specified as the lower side frame and the left side frame when the specific position $P_0$ is at the center $C_0$ of the image area G3. Nevertheless, when the specific position $P_0$ is located at a right lower area, the travel indication line AA is directed from the right lower portion to the center $C_0$, and the frame lines B1, B2 are specified as the upper side frame and the left side frame. Further, when the specific position $P_0$ is located at a left lower area, the travel indication line AA is directed from the left lower portion to the center $C_0$, and the frame lines B1, B2 are specified as the upper side frame and the right side frame. Furthermore, as shown in FIG. 7A, the travel indication line AA and the frame lines B1, B2 are displayed at the previous (current) display image wherein a graphic frame is displayed.

As described above, the guide information displayed at the display unit 2 includes the travel indication line AA defined from the specific position $P_0$ pointed out by the mouse 31 to the center $C_0$ of the image area G3 at the display unit 2. Further, the guide information also includes frame lines B1 and B2 of the display image to be displayed at the display unit 2, when the specific position $P_0$ pointed out by the mouse 31 is located at the center $C_0$ of the image area G3. Namely, the frame lines indicate frames of the following display image on the previous display image currently displayed at the image area G3, and thus the operator can recognize the area of the following display image by looking at the previous (or current) display image.

FIGS. 8A and 8B are diagrams for explaining a panning process of the embodiment of the panning control device according to the present invention. In FIGS. 8A and 8B, references $GF_1$ denotes a graphic in the form of a circle, $GF_2$ denotes a graphic in the form of a square, $GF_3$ denotes a graphic in the form of a triangle, G3 denotes an image area of a display unit, $C_0$ denotes a center of the image area G3, and $P_0$ denotes a specific position pointed out by a pointing device. Further, as described above, references G1 denotes a message area, G2 denotes a menu area, and G4 denotes a data area. Note, when comparing FIG. 1A and FIG. 8A, the image displayed at the image area G33 shown in FIG. 1A corresponds to that shown in the image area G3 of FIG. 8A. Further, in FIGS. 8A and 8B, a mark "+" denotes a position of a cursor, and the cursor position "+" shown in FIG. 8B corresponds to the specific position $P_0$ pointed out by the mouse 31.

As described above with reference to FIGS. 1A and 1B, in the prior art panning control device, when an operator requires a display of the graphic forms $GF_{11}$ and $GF_{22}$ at the image area G33 of the display unit, such that the graphic form $GF_{11}$ (circle shape) is located at about the center $C_{00}$ thereof, the operator moves the position "+" of the cursor at the specific position $P_{00}$. Namely, in the prior art, the specific position $P_{00}$ is such that the operator considers that a required center satisfies the conditions required for the graphic forms, but the operator cannot confirm the following display image having a center specified as the specific position $P_{00}$, and thus the required display image may not be displayed at the image area G33. Concretely, as shown in FIG. 1B, when determining the specific position $P_{00}$ as the center $C_{00}$, all of the graphic form $GF_{22}$ (square shape) may not be included in the image area G33 of the display unit.

As shown in FIG. 8B, however, in the present embodiment, when an operator requires a display of the graphic forms $GF_1$ and $GF_2$ at the image area G3 of the display unit, such that the graphic form $GF_1$ is located at about the center $C_0$ thereof, the operator moves the position "+" of the cursor at the specific position $P_0$ in accordance with the guide information constituted by the travel indication line AA and frame lines B1 and B2. Namely, the frame lines B1 and B2 show frames of the following display image on the previous display image, and thus the operator can recognize the area of the following display image by looking at the previous display image. Note, the travel indication line AA is formed by an arrow led from the specific position $P_0$ to the center $C_0$, and thus the operator can confirm a traveling direction and a traveling distance from the arrow (AA).

Concretely, for example, as described above, when releasing the center button 311b of the mouse body 311 shown in FIG. 5A, or when determining the panning position (step S4 shown in FIG. 6) and carrying out the pan-hit operation (or panning process of step S5 shown in FIG. 6) in the state shown in FIG. 8B, all of the following display image, which is the same as shown in FIG. 1B, i.e., the graphic form $GF_2$, is not included in the image area G3. Therefore, in such a case, according to the present embodiment, the operator can move the cursor (or specific position $P_0$) in a left lower direction in order to obtain a display of all of the graphic form $GF_2$ in the image area G3, by looking at the guide information displayed at the previous (current) display image, whereby all of the graphic form $GF_2$ can be included in the image area G3 in the following display image.

Therefore, according to the present embodiment, the operator can recognize or confirm an area of the display image to be displayed at the display unit 2, before a display thereof, by using the guide information displayed thereat. Namely, it is not necessary, when obtaining a display of a required area of the display image, to carry out a pan-hit operation many times, and thus the pan-hit operations for obtaining a required display image at the display unit 2 can be greatly reduced. Consequently, a display of a required display image can be easily obtained at a display unit 2, and thus the labour effectivity can be increased.

In accordance with the present invention as described above, a panning control device comprises a memory unit, a display unit, a pointing unit, a panning control unit, and a display control unit. The panning control unit calculates and outputs guide information concerning a display image to be displayed at the display unit, when a specific position pointed out by the pointing unit is placed at the center of the display image at the display unit. The display control unit controls the display image at the display unit to conform to the guide information output from the panning control unit, and therefore, pan-hit operations (or panning operations) for obtaining a display of a required display image at the display unit can be greatly reduced, and thus a display of a required display image can be easily obtained at a display unit, and the labour effectivity thereby increased.

Many widely differing embodiments of the present invention may be constructed without departing from the spirit and scope of the present invention, and it should be understood that the present invention is not limited to the specific embodiments described in this specification, except as defined in the appended claims.

I claim:

1. A panning control device, comprising:
   a memory means for storing image data;
   a display means for displaying a part of the image data stored in said memory means, as a display image;
   a pointing means for pointing out a specific position of the display image displayed at said display means;
   a panning control means, connected to said pointing means, for calculating and outputting guide information concerning a display image to be displayed at said display means, when the specific position pointed out by said pointing means is placed at a center of the image displayed at said display means; and
   a display control means connected to said memory means, said display means, said pointing means, and said panning control means, for controlling the display image at said display means to conform to the guide information output from said panning control means such that said guide information includes frame lines of the display image to be displayed and a travel indication line having one end at the specific position pointed out by said pointing means and having its other end at another location on the display means.

2. A panning control device as claimed in claim 1, wherein said travel indication line is defined from the specific position pointed out by said pointing means to the center of the image displayed at said display means.

3. A panning control device as claimed in claim 2, wherein said travel indication line is formed by an arrow leg from said specific position to said center of said image.

4. A panning control device as claimed in claim 1, wherein said frame lines of the display image to be displayed at said display means are for a case in which the specific position pointed out by said pointing means is to be disposed at the center of the image currently displayed at said display means.

5. A panning control device as claimed in claim 1, wherein a scope of said display means includes an image area for displaying the display image.

6. A panning control device as claimed in claim 5, wherein the scope of said display means further includes a message area for displaying messages, and a menu area for displaying processes and graphic elements.

7. A panning control device as claimed in claim 6, wherein the scope of said display means further includes a data area for displaying image data of the display image currently displayed at said image area.

8. A panning control device as claimed in claim 1, wherein said pointing means comprises a mouse.

9. A panning control device as claimed in claim 8, wherein said mouse is an optical mouse including a mouse body and a reflection board.

10. A panning control device as claimed in claim 9, wherein said mouse body includes a button for controlling a panning operation by a depression or release of the button.

11. A panning control device as claimed in claim 1, wherein said pointing means comprises a tablet including a stylus pen and a tablet table.

12. A panning control device as claimed in claim 11, wherein said stylus pen includes a button for controlling a panning operation by a depression or release of the button.

13. A panning control device as claimed in claim 1, wherein said panning control means and said display control means are constituted by a one chip microprocessor unit.

* * * * *